United States Patent [19]

Wesemeier

[11] 4,019,398
[45] Apr. 26, 1977

[54] V-BELT PULLEY WITH AUTOMATIC TENSIONING DEVICE

[75] Inventor: Reinhard Wesemeier, Neuss, Germany

[73] Assignee: International Harvester Company, Chicago, Ill.

[22] Filed: Nov. 26, 1975

[21] Appl. No.: 635,566

[30] Foreign Application Priority Data

Nov. 29, 1974 Germany .................... 2456553

[52] U.S. Cl. ...................... 74/230.17 C; 74/242.8
[51] Int. Cl.² ................ F16H 9/00; F16H 9/12; F16H 7/08
[58] Field of Search ........... 74/230.17 B, 230.17 C, 74/230.17 P, 230.17 R, 230.3, 242.8

[56] References Cited

UNITED STATES PATENTS

| | | | |
|---|---|---|---|
| 1,416,745 | 5/1922 | Peters | 74/230.17 B |
| 2,037,436 | 4/1936 | Roddewig et al. | 74/230.17 B |
| 2,289,573 | 7/1942 | Almen | 74/230.17 C |
| 2,475,955 | 7/1949 | Gerbing | 74/230.17 C |
| 2,573,197 | 10/1951 | Hart | 74/230.17 B |
| 2,896,461 | 7/1959 | Grevich | 74/230.17 C |
| 3,060,759 | 10/1962 | Van Der Brugghen | 74/230.17 C |
| 3,727,476 | 4/1973 | Heidorn | 74/230.17 C |
| 3,910,129 | 10/1975 | Phillips | 74/230.17 B |

FOREIGN PATENTS OR APPLICATIONS 285,038 12/1912 Germany .................... 74/230.17 B

*Primary Examiner*—Samuel Scott
*Assistant Examiner*—Allan R. Burke
*Attorney, Agent, or Firm*—Raymond E. Parks; Floyd B. Harman

[57] ABSTRACT

An automatically adjustable V-belt pulley which has a moveable pulley half that is resiliently urged by a compression spring axially towards a fixed pulley half in order to vary the dimension of the V-belt receiving groove defined therebetween and to maintain a substantially constant tension on the V-belt as it expands during continued use. A restraining means is provided between the spring and moveable pulley half which only permits expansion of the spring and axial movement of said pulley half in one direction.

7 Claims, 2 Drawing Figures

V-BELT PULLEY WITH AUTOMATIC TENSIONING DEVICE

BACKGROUND OF THE INVENTION

This invention relates to a V-belt pulley provided with an automatic belt tensioning device comprising two halves of a cone pulley which are arranged in a non-rotating manner on a shaft. At least one of the two halves can be moved axially by the force of a pressure spring towards the second half one in order to vary the dimension of the V-belt receiving groove defined therebetween.

DESCRIPTION OF THE PRIOR ART

A V-belt pulley of this type is known through the German published patent application (DAS) No. 1,121,897 —Lein—Jan. 11, 1962. On this known V-belt pulley the pressure spring is designed in the form of a dish spring arranged at the outside of the axially adjustable half of the cone pulley. The dish spring has a cone shaped elastic tongued section which is supported along its periphery on the cone pulley half, while its appertured inner section is sleeved over the hub of the pulley half and abuts with a bushing carried on the shaft. By means of the dish spring and bushing the one half of the cone pulley is moved toward the second half of the cone pulley to provide the contact pressure which is required to pull a V-belt which is arranged in the groove formed between the two halves of the cone pulley. On this known V-belt pulley the restoring forces originating from the V-belt must also be absorbed by the dish spring. An arrangement of this kind presents by disadvantage of having to provide an optimum design for one particular operating condition only, since in case of an optimum design of the pressure spring, this could adversely affect the effectiveness of the dish spring to absorb the restoring forces, and vice versa.

SUMMARY OF THE INVENTION

This invention is based on the objective of designing a V-belt pulley of the initially mentioned kind which has an automatic tensioning device and does not have the disadvantages of the prior design. It distinguishes itself by a less complicated and improved fit or tensioning means for the V-belt. According to the invention this problem is solved by providing an element which permits the pulley half to move in the direction of the bias force of the spring. The element is supported on a shaft and is movable in an axial direction together with the moveable pulley half. It operates to restrain axial movement of the movable pulley half in the opposite direction. Therefore, there is provided in a V-belt pulley, which has an automatic V-belt tensioning arrangement, a shaft, a first pulley half carried on the shaft, a compession spring resiliently urging the first pulley half axially along the shaft towards a second pulley half which is fixed to the shaft, a key means drivingly connecting the pulley halves, and a means between the spring and the first pulley half which permits the expansion of the spring and limits the axial movement of the first pulley half to only one direction. As regards the invention, it is of importance that for the forces required to produce the necessary contact pressure between the V-belt and groove, on the one hand, and for forces required to maintain the V-belt in tension, on the other hand, separate elements are used which are adapted individually to the respective operating conditions. This way an effective and steady tensioning of the V-belt is achieved, even after the V-belt is stretched by continued use. A perfect absorption of the restoring forces is possible by means of an element producing a self-locking effect in one direction. This element can consist of parts or segments embracing the shaft, whereby the parts or segments are kept pre-stressed by a compression spring in a manner initiating the self-locking effect required for the absorption of the restoring forces.

In an appropriate design according to the invention the element is designed in form of an apertured disc having spring-like fingers. Expediently this disc with spring-like fingers has an outer periphery which is supported directly or indirectly on the adjustable or moveable half of the cone pulley. Its apertured inner periphery has radially extending fingers which engage on the shaft. The fingers are preferably slightly prestressed. It is of importance that the diaphragm-like spring stops the axial movement of the adjustable half of the cone pulley against the bias effort of the compression spring with the toothed edge of its inner periphery, so that the restoring forces coming from the V-belt are effectively absorbed. On the other hand, the diaphragm spring which assumes a Belleville washer-like state lets the compression spring develop its full effect in its direction of force.

Preferably the diaphragm spring is supported in a locating cup fastened on the adjustable half of the cone pulley. This assures an accurate guiding means for the diaphragm or disc spring. The guiding means further includes an end plate which is located in the locating cup and is arranged vertically to the axis of the shaft. The outer peripheral portion of the disc spring contacts the end plate within the locating cup.

A particularly advantageous feature of design is a housing which is arranged on the shaft and encloses, in a bowl-like manner, the compression and disc springs and the locating cup. This way the compression spring, the diaphragm or Belleville spring, the end plate, and the locating cup, too, are accommodated within the housing and are protected from mechanical damage and contaminants in the air.

It is advantages to support one end of the compression spring on the inner base surface of the cup-like housing and to support the other end of the spring on the conical surface of the diaphragm spring. The housing itself can be moved axially on the shaft and can be locked in set positions. This way the contact pressure exerted upon the V-belt can be adjusted by correspondingly adjusting the moveable half of the cone pulley to the desired dimension for the V-shaped groove between the pulley halves.

BRIEF DESCRIPTION OF THE DRAWING

In order that the invention may be readily understood and put into practical effect, reference will now be made to the various figures of the drawing in which.

DESCRIPTION OF THE PREFERRED EMBODIMENT

Figure 2:
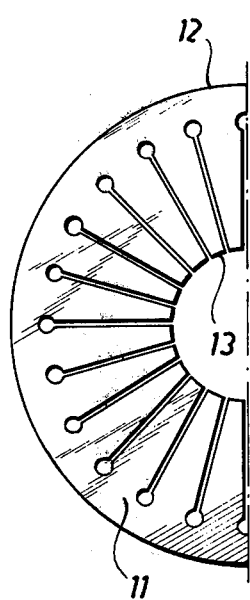
FIG. 2 illustrates a front view of a symmetrical half of the diaphragm spring used in the V-belt tensioning device.
Figure 1:
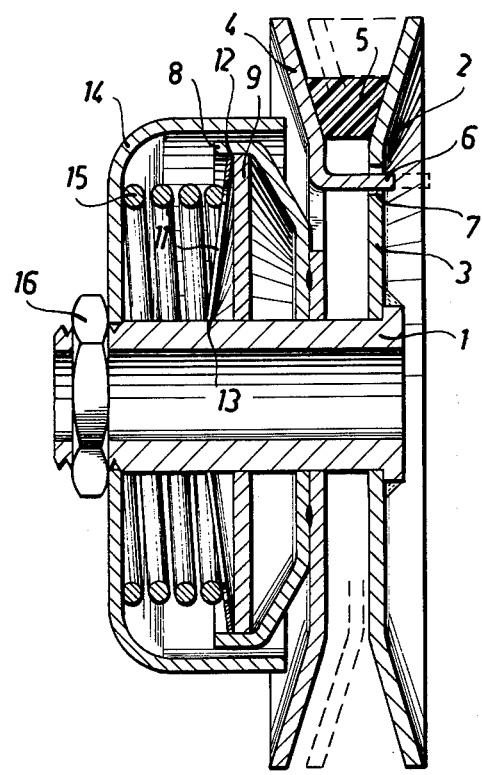
FIG. 1 is a cross sectional view of a V-belt pulley incorporating the V-belt tensioning device according to the teachings of the disclosure.

On a shaft 1 there is arranged a V-belt pulley 2 which comprises first and second pulley halves 4 and 3 of a cone or V-belt pulley. The second pulley half 3 is welded or fixed to the shaft 1 and the first pulley half 4 of the cone or V-belt pulley is arranged opposite the first half. The first pulley half 4 is axially moveable along the shaft, with respect to the second pulley half 3. A V-belt pulley 5 is shown seated in the groove defined between both halves of the cone pulley. The tension in the V-belt acts radially on the pulley to expand the halves axially. As the V-belt stretches, after continued use, it assumes the position shown in dotted lines. In this event the movable half 4 of the cone pulley shifts axially to accommodate the stretched V-belt as will be describe later on. Both halves of the cone pulley 3 and 4, are fitted in a non-rotating manner on the shaft 1. For accomplishing this, a key means comprising a flange or tab 6 is punched out of the web portion of the moveable half 4 of the cone pulley. The tab 6 is bent sideways and is inserted in an opening 7 provided for this purpose in the web portion of the fixed or other half 3 of the cone pulley. Onto the web portion of the moveable half 4 of the cone pulley a locating or first cup 8 is welded or afixed thereto, in which a bottom or end plate or a flat washer 9 is positioned. The outer periphery 12 of an apertured disc spring 11 rests on the end plate 9. The disc spring has a plurality of radially extending fingers which are slightly pre-stressed when their tips 13 engage on the shaft 1. A compression spring 15, which may be designed in form of a helical spring, is arranged between the diaphragm spring 11 and the inside base or bottom of a bowl-shaped housing or second cup 14 which telescopes over the first cup. The base of the housing 14 has an opening which is placed over an annular groove in the shaft 1 and it is secured to the shaft against axial movement by means of locknut 16.

The helical compression spring 15 operates to move the inner or moveable half 4 of the cone pulley towards the fixed or outer half 3 of the cone pulley in order to produce the contact pressure required to produce the pulls on the tight and slack sides of the V-belt 5 for running the same. The diaphragm spring 11 is designed and arranged on the shaft 1 in a manner which prevents any impairing of the axial expansion of the helical compression spring 15. The diaphragm spring 11 absorbs the restoring forces which originate from the V-belt and pass these forces onto the locating cup 8 and to the end plate 9 via the moveable or one half 4 of the cone pulley. Since the conic toothed portion about the annular opening 13 in the diaphragm spring 11 extends around or sits on the shaft 1 it thus produces a self-locking effect. By that means, the restoration to a previous dimension of the belt receiving groove by axial movement of the moveable half 4 of the cone pulley in the opposite direction is prevented. Since this half 4 of the cone pulley is moved steadily towards the V-belt 5 by the expansion of the helical compression spring 15, an automatic tensioning device is obtained which represents an optimum design as regards both, the compressive forces required and the restoring forces originating from the V-belt.

It is to be understood that the invention is not limited to the embodiment shown, but permits modification within the scope of the claims. For example: the element 11 which restrains the axial movement of the movable half 4 away from the fixed half 3 of the cone pulley does not necessarily need to be designed in form of a diaphragm spring. In principle, a non-elastic element could be used, such as a Belleville washer; even a slightly conical inwardly drawn section of the inner periphery of the locating cup 8 would serve the purpose. Furthermore, the locating cup 8 and the end plate 9 do not need to be designed as separate members.

A guiding of the outer periphery of the diaphragm spring could also be achieved by letting the outer periphery of the diaphragm spring engage in an annular groove provided in the locating cup 8. In principle it is also possible to design the housing 14 (provided to support the helical compression spring 15) to be axially movable on the shaft 1, so that compressive forces of varying intensity can be exerted by the compression spring and thus the contact pressures can be varied. This, for example, can be effected by inserting spacers between the housing and a collar provided on the shaft 1. Finally, the non-rotating design of the one half 4 of the cone pulley can be achieved by different means of design.

The embodiments of the invention in which an exclusive property of priviledge is claimed are defined as follows:

1. In a V-belt pulley having an automatic V-belt tensioning arrangement comprising a shaft, a first pulley half carried on the shaft, a compression spring resiliently urging the first pulley half axially along the shaft towards a second pulley half fixed to the shaft, key means drivingly connecting the pulley halves and a means between the spring and the first pulley half for permitting expansion of the spring and limiting the axial movement of the first pulley half to only one direction.

2. In a V-belt pulley according to claim 1 wherein the permitting and limiting means include an apertured disc sleeved over the shaft and conically deflected at the outer periphery against the first pulley half.

3. In a V-belt pulley according to claim 2 wherein the apertured disc has a plurality of radially extending fingers which are flexed in an axial direction away from the first pulley half and grip the shaft.

4. In a V-belt pulley according to claim 2 wherein the permitting and limiting means further include a first cup connected to the first pulley half, a second cup telescopically mounted over the fist cup, and means for connecting the second cup to the shaft, the spring extending between the bottoms of the cups, and the apertured disc being interposed between the bottom of the first cup and the adjacent end of the spring.

5. In a V-belt pulley according to claim 2 wherein the key means include a tab extending outwardly from one of the pulley halves which passes through an opening provided in the other pulley half.

6. In a V-belt according to claim 5 wherein the permitting and limiting means further include a first cup connected to the first pulley half, a second cup telescopically mounted over the first cup, and means for connecting the second cup to the shaft, the spring extending between the bottoms of the cups, and the apertured disc being interposed between the base of the first cup and the adjacent end of the spring;

7. In a V-belt pulley according to claim 6 wherein the apertured disc has a plurality of radially extending fingers which are flexed in an axial direction away from the first pulley half and grip the shaft.

* * * * *